Nov. 27, 1923.  1,475,691

E. S. ENSIGN

ANTITHEFT PLATE FOR AUTOMOBILES

Filed July 19, 1920

Witness:
R. Burkhardt

Inventor:
Emory S. Ensign,
By Wilkinson Huxley Byron & Knight
Attys.

Patented Nov. 27, 1923.

1,475,691

UNITED STATES PATENT OFFICE.

EMORY S. ENSIGN, OF EVANSTON, ILLINOIS.

ANTITHEFT PLATE FOR AUTOMOBILES.

Application filed July 19, 1920. Serial No. 397,308.

*To all whom it may concern:*

Be it known that I, EMORY S. ENSIGN, a citizen of the United States, residing at Evanston, in the county of Cook and State of Illinois, have invented certain new and useful Improvements in Antitheft Plates for Automobiles, of which the following is a specification.

This invention relates to a device adapted to be applied to an automobile in position to be readily observed, and bearing a legend conveying the information that the car, if in motion, is being used without authority; and the invention has for its object to provide a simple, conveniently applied, and effective device of this character, in a position for securing it upon the automobile which will not only render it conspicuous when the automobile is in use but will impress upon the authorized operator, when occupying the driver's seat, the fact that it is present, and thus insure its removal before starting the car.

Accordingly, the invention consists in providing a plate, bearing an appropriate legend, with means for mounting it upon the windshield of an automobile, and insuring against movement of the windshield to withdraw the device from view by interlocking it with not only the part of the windshield upon which it is mounted, but also with a part, for instance, of a complementary member of the windshield, relatively to which movement would have to take place in swinging the device with the windshield out of visible position.

In order that the invention may be fully understood, one embodiment thereof will be described with reference to the accompanying drawing. In said drawing—

Figure 1:
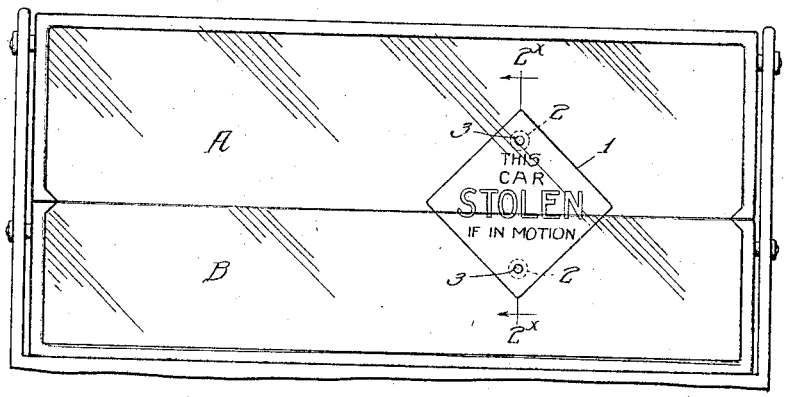
Figure 1 is a front view of a two-part windshield having the device applied thereto.
Figure 2:
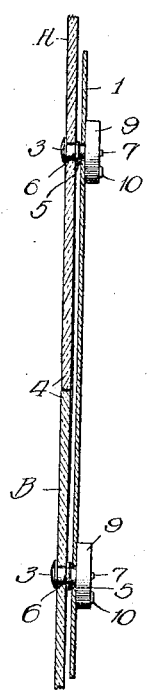
Figure 2 is a vertical section on the line 2×—2× of Figure 1.
Figure 3:
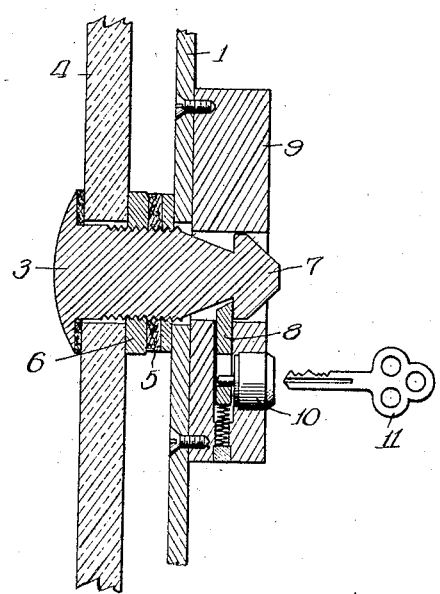
Figure 3 is a detail view of one of the two similar locks preferably employed for controlling the connection of the device with each windshield part.

A and B represent two swinging members of an automobile windshield. 1 represents an anti-theft plate having upon it the word "Stolen" or some other legend appropriate to the purpose for which it is intended. 2 represents interlocking means adapted to interlock the plate 1 with each of the windshield members A and B so as to mount the device upon the windshield in plain view and to lock the windshield members together, so that the device cannot be removed from view by swinging the windshield out of position. Each interlocking means 2, preferably consists of a stud 3 passed through the glass 4 of the windshield, and there secured in any suitable way, as, for instance, by nut 5 with interposed packing 6, and having upon its protruding end a shoulder head 7 adapted to be engaged by a locking bolt or bolts 8 mounted in the casing 9 carried by the plate 1. The construction is preferably such that the interlock may be established by pressing the stud 3 through the opening of the plate 1 and into the lock casing 9, and the studs 3 are preferably inserted from the front side of the windshield so that the plate 1 may be applied before leaving the seat, and, when applied, its legend will show through the windshield for the purpose intended. Bolt 8 will be controlled by any suitable form of lock, such, for instance, as the pin tumbler barrel 10 responsive to key 11.

Obviously, one of the interlocking devices 2 could be made to slide into interlock with one member of the windshield and the other alone relied on for key control, but preferably, and in the interest of safety, each of the devices 2 is made in the form of a key controlled interlocking device.

The device as above described may readily be pressed into position by the driver of an automobile before leaving his seat, and so long as it remains it will constitute an announcement, if the car is in motion, that the car is being used contrary to the owner's will, and justify detention of the driver by the constitute authorities. Being in position to intercept the vision of the driver, the fact of its presence will be impressed upon the authorized driver upon his return to the car, and oversight in removal of the protective device before driving away will be prevented.

It is not necessary that the lock casings 9 be permanently secured to the plate 1; on the contrary, the locks can be left free for removal from the plate, so that the plate will be of minimum thickness and therefore more easily stowed away, such as under the seat. The plate would, in this case, be placed in position first and the locks then snapped over the pins to hold the plate in position, with the same effect as if the locks were left attached to the plate.

The expression "key-control" as used in the specification and claims is to be interpreted as including any form of device which brings the interlocking means under control of the authorized person, whether it be a key actuated lock, a permutation or combination lock, an interengaging device controlled by a token or inserted piece, or what not. The term legend-plate is to be interpreted as meaning any tell-tale plate or visual device adapted to be applied as described.

I claim:

1. An anti-theft device for automobiles, comprising a tell-tale plate and lock-controlled means for mounting the plate in visible position upon and interlocking it with the movable part of a windshield and for interengaging the plate with a part relatively to which said movable part of the windshield is adapted to move, and thereby prevent movement of the wind shield to withdraw the plate from visible position.

2. An anti-theft device for automobiles, comprising a rigid legend plate adapted to bridge the line of division between two relatively movable members of a windshield, and having means for releasably interengaging it with both said members.

3. An anti-theft device for automobiles, comprising a tell-tale plate adapted to bridge the dividing line between two relatively movable members of a windshield, and having means for interlocking it with each of said members, and a key-controlled means for releasing the plate.

4. An anti-theft device for automobiles, comprising a tell-tale plate adapted to bridge the dividing line between two relatively movable members of a windshield and carrying independent means for interlocking it with each of said members, and a key-controlled means for each of said interlocking means adapted to release the same.

5. In an anti-theft device for automobiles, a tell-tale plate, a means for interlocking said plate comprising a headed stud adapted to pass through a part of the windshield, and a key-controlled lock carried by the plate and adapted to receive the head of the stud.

Signed at Chicago, Illinois, this 17th day of July, 1920.

EMORY S. ENSIGN.